(12) United States Patent
Blea et al.

(10) Patent No.: US 9,697,270 B2
(45) Date of Patent: *Jul. 4, 2017

(54) AUTOMATIC ADJUSTMENT OF DATA REPLICATION BASED ON DATA ACCESS

(71) Applicant: International Business Machines Corporation, Armonk, NY (US)

(72) Inventors: David R. Blea, Round Rock, TX (US); Matthew E. Brooks, Vail, AZ (US); Steven M. Kern, Vail, AZ (US); Khang N. Nguyen, Vail, AZ (US); Scott N. Trevett, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/234,092

(22) Filed: Aug. 11, 2016

(65) Prior Publication Data

US 2016/0342675 A1     Nov. 24, 2016

Related U.S. Application Data

(63) Continuation of application No. 15/007,285, filed on Jan. 27, 2016, now Pat. No. 9,471,658, which is a continuation of application No. 14/228,304, filed on Mar. 28, 2014, now Pat. No. 9,507,844.

(51) Int. Cl.
*G06F 17/30* (2006.01)
(52) U.S. Cl.
CPC .............................. *G06F 17/30575* (2013.01)

(58) Field of Classification Search
CPC combination set(s) only.
See application file for complete search history.

(56) References Cited

U.S. PATENT DOCUMENTS

| | | | |
|---|---|---|---|
| 6,292,835 B1 | 9/2001 | Huang et al. | |
| 7,188,125 B1 | 3/2007 | Karr | |
| 7,398,364 B2 | 7/2008 | Maruyama et al. | |
| 8,341,115 B1 | 12/2012 | Natanzon et al. | |
| 9,471,658 B2 * | 10/2016 | Blea ................. | G06F 17/30575 |

(Continued)

OTHER PUBLICATIONS

Blea et al., "Automatic Adjustment of Data Replication Based on Data Access", U.S. Appl. No. 15/397,792, filed Apr. 1, 2017, pp. 1-23.

(Continued)

*Primary Examiner* — Etienne Leroux
(74) *Attorney, Agent, or Firm* — Brian M. Restauro

(57) ABSTRACT

A processor determines a predicted quantity of updates to be made to a set of data using a history of updates. The set of data is associated with a category of replication that indicates a first frequency of data replication to be applied to the set of data. The processor determines whether the first predicted quantity of updates meets a first threshold for a frequency of replication of the set of data. The first threshold indicates an allowed number of updates and meeting the first threshold indicates that an adjustment to the frequency of replication of the set of data is to be initiated. The processor responds to a determination that the first threshold has been met by associating the set of data with a category of replication that has a second frequency of data replication to be applied to the set of data.

1 Claim, 3 Drawing Sheets

(56) References Cited

U.S. PATENT DOCUMENTS

| | | |
|---|---|---|
| 9,507,844 B2 | 11/2016 | Blea et al. |
| 2006/0007878 A1 | 1/2006 | Xu et al. |
| 2008/0154979 A1 | 6/2008 | Saitoh et al. |
| 2011/0313974 A1 | 12/2011 | Chen |
| 2012/0110328 A1 | 5/2012 | Pate et al. |
| 2012/0151164 A1 | 6/2012 | Nayak |
| 2014/0324774 A1 | 10/2014 | Chen et al. |
| 2015/0278331 A1 | 10/2015 | Blea et al. |
| 2016/0132580 A1 | 5/2016 | Blea et al. |

OTHER PUBLICATIONS

IBM Appendix P, "List of IBM Patents or Patent Applications to be Treated as Related", Dated Jan. 4, 2017, 2 pages.

Blea et al., "Automatic Adjustment of Data Replication Based on Data Access", U.S. Appl. No. 14/228,304, filed Mar. 28, 2014, 31 pages.

Blea et al., "Automatic Adjustment of Data Replicaiton Based on Data Access", U.S. Appl. No. 15/007,285, filed Jan. 27, 2016, 23 pages.

* cited by examiner

AUTOMATIC ADJUSTMENT OF DATA REPLICATION BASED ON DATA ACCESS

BACKGROUND OF THE INVENTION

The present invention relates generally to the field of data replication, and more particularly to changing types of data replication.

Within the scope of enterprise storage systems, there are various types of data replication. Data replication can be used for a variety of purposes, including disaster recovery, high availability, and business continuance. Often times, data replication solutions that offer a higher tier of data protection also have higher requirements on the replication environment. For example, single site copies, such as snapshots, can be performed relatively quickly with little to no impact to applications. However, copies that require site to site communication, or may even span more than two sites, incur either additional latency for the host (as in synchronous solutions), or potential delays between when a write is stored on the source storage system and when that data is protected by a copy on a remote site (asynchronous solutions). Environmental requirements, like more bandwidth between the sites, can lead to additional costs to the customer in order to avoid impacting the application.

SUMMARY

Embodiments of the present invention provide a method, system, and program product for modifying a frequency of replication of a set of data. A processor determines first predicted quantity of updates that are likely to be made to a set of data based, at least in part, on a history of updates for the set of data. The set of data is associated with a first category of replication that indicates a first frequency of data replication to be applied to the set of data. The processor determines whether the first predicted quantity meets a first threshold for a frequency of replication of the set of data, wherein the first threshold indicates an allowed number of updates for the set of data, and wherein a meeting of the first threshold indicates that an adjustment to the first frequency of replication of the set of data is to be initiated. The processor predicts a degree of latency that will be experienced during replication of the set of data. The processor determines whether the first predicted quantity meets a plurality of thresholds for the frequency of replication of the set of data. The processor responds to a determination that the first predicted quantity meets the plurality of thresholds by identifying a threshold, included in the plurality of thresholds, that has the highest priority. The processor responds to a determination that the first threshold has been met by associating the set of data with a second category of replication. The second category of replication indicates a second frequency of data replication to be applied to the set of data. The association of the set of data with the second category of replication is based, at least in part, on i) the threshold that has the highest priority and ii) the predicted degree of latency meeting a third threshold. The third threshold indicates a degree of latency that is allowed for given mode of data transmission. The processor associates the second category of replication with at least one of i) a type of storage media to be used during the replication of the set of data, ii) a mode of data transmission to be used during the replication of the set of data, and iii) a type of data that represents the set of data during the replication of the set of data. The associating is based, at least in part, on the first predicted quantity meeting a second threshold for the frequency of replication of the set of data. The second threshold being met indicates at least one of i) the type of storage media to be used during the replication of the set of data, ii) the mode of data transmission to be used during the replication of the set of data, and iii) the type of data that represents the set of data during the replication of the set of data. The processor responds to a determination that the first threshold has been met by delaying, for a predetermined period of time, a determination as to whether a second predicted quantity of updates that are likely to be made to the set of data meets a third threshold for the frequency of replication of the set of data. The delay allows for completion of a normalization process following replication of the set of data.

DETAILED DESCRIPTION

Figure 1:
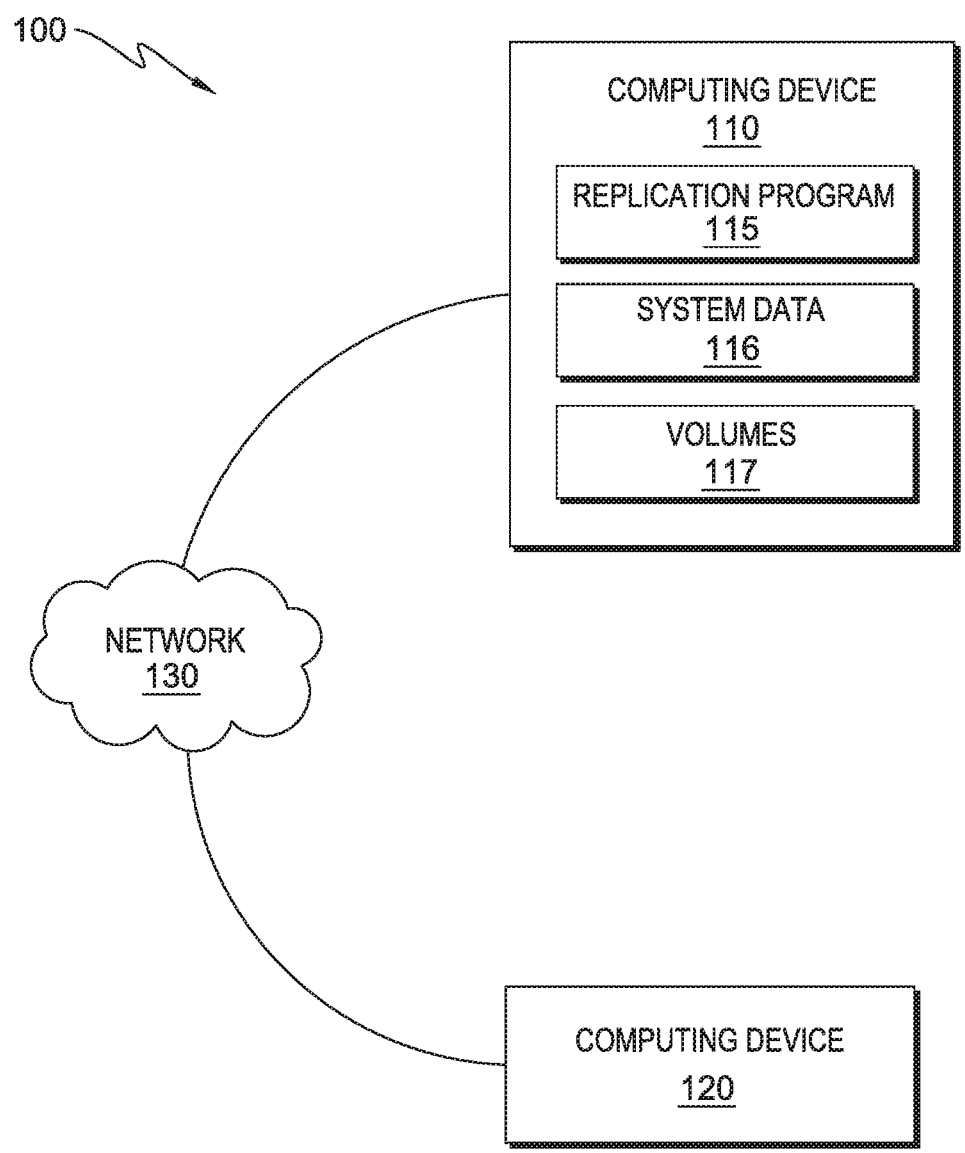
FIG. 1 is a functional block diagram illustrating a data replication environment, in accordance with an exemplary embodiment of the present invention.

Hierarchical storage management (HSM) is a data storage technique, which automatically moves data between high-cost and low-cost storage media. HSM systems exist because high-speed storage devices, such as hard disk drive arrays, are, in general, more expensive (per byte stored) than slower devices, such as optical discs and magnetic tape drives. A storage tier indicates a collection of storage devices of a particular type of storage that can be, or is to be, used to store a given partitioned volume. In general there are two transfer modes that can be used to transfer the partitioned volume for storage from one storage tier to another, namely synchronous and asynchronous. In a synchronous transfer mode, the data write either completes on both a primary storage device and a secondary storage device or not at all. In contrast, in an asynchronous transfer mode, the write is considered complete as soon as a single storage device, of a plurality of storage devices that are to complete the write, acknowledges the write as complete, i.e., the write to the primary storage device and a secondary storage device are not dependent on one another for completion.

The closest known solutions dynamically modify the transfer mode of data storage from synchronous to asynchronous based on the latency and input and output (I/O) transfer rate between the source and target storage devices. Known solutions dynamically modify a plurality of transfer modes for a partitioned volume based on the access rate for I/O on the primary storage system. Such solutions are, in some cases, based on an algorithm for dynamically changing the transfer modes based on a threshold policy associated with the degree of impact such transfers may be causing an application. As such, these known solutions are directed to manipulation of a storage tier and the transfer mode to be utilized, not a replication category. A replication category indicates how often a given set of data, which is not limited to a partitioned volume, should be backed up or copied from one location to another. In general, a set of data that is rarely accessed will be less likely to need backup, since it likely has not changed.

In contrast to known solutions that address storage tiers, embodiments of the present invention are directed to replication categories. In addition, embodiments of the present invention are not focused solely on the I/O transfer between sites. In contrast, embodiments of the present invention are directed to the control of replication of a set of data based on the I/O rates to those sets of data. Embodiments of the present invention recognize that the number of I/O updates to a set of data can be used to indicate the importance of a set of data for replication purposes, i.e., I/O events, to the individual sets of data can be used to indicate the "importance" of those sets of data and thus how often they should be replicated. This means that the decision to switch between replication categories occur at the level of a set of data, as opposed to occurring at the level of a storage tier of a site.

As such, embodiments of the present invention are directed to the "importance" of the set of data as the primary characteristic that determines a replication category for a given set of data. A replication category is a category of data replication that is associated with a set of data, thereby controlling how frequently that set of data is replicated. This allows a replication system to dynamically move the set of data between different categories of replication to provide better backup consistency for all sets of data, regardless of how often they are accessed. This means that the decision to switch between different replication categories happens at a set of data level based on the relative importance of the set of data, as opposed to being solely tied to the I/O frequency and application impact.

Embodiments of the present invention recognize one or more of the following: i) that replication of a set of data needs may not be static; ii) during certain time periods, there are fluctuations in the rates of I/O to certain sets of data, i.e., reads and writes, to a given set of data during one time period can be higher or lower than during other time periods; iii) (iii) bandwidth requirements for synchronous replication fluctuate in proportion to the rate of I/O to the site being replicated; (iv) a high bandwidth connection can be costly; (v) a high bandwidth connection may be underutilized during periods of low I/O activity at the site being replicated, which is wasteful; and vi) that a proactive approach can be used to predict future I/O rate for a particular set of data and that a replication category of a set of data can be adjusted accordingly.

Embodiments of the present invention dynamically change the rates of replication, i.e., replication categories, of sets of data based on changing I/O rates to the sets of data. In other words, embodiments of the present invention change the replication category of a set of data automatically based upon changing host I/O rates of that set of data. Embodiments of the present invention address not only dynamically creating new copy relationships, but converting between different copy relationship types. There are multiple criteria which could be used to change the replication category.

In certain embodiments of the present invention, some users may prefer to change replication category based on host impact with the purpose of reducing host impact. For instance, a synchronous copy may have more impact than an asynchronous copy. In such a case, higher I/O to a set of data could trigger a less impactful replication. In certain embodiments of the present invention, users may prefer to change replication category based on data importance, where more heavily used sets of data are considered more important. In such a case, higher I/O to a set of data could trigger greater data protection, such as more sites for use in replication, more frequent replication, more copies of data, or a combination thereof.

In certain embodiments of the present invention, for replication types where a greater level of data protection results in more host impact, a policy can be used to determine whether to prefer less impactful replication or to prefer greater data importance.

The present invention will now be described in detail with reference to the Figures. FIG. 1 is a functional block diagram illustrating a data replication environment, generally designated 100, in accordance with one embodiment of the present invention. Data replication environment 100 includes computing device 110 and computing device 120 connected over network 130. Computing device 110 includes replication program 115, system data 116, and volumes 117.

In various embodiments of the present invention, computing device 110 and computing device 120 are respectively a computing device that can be a standalone device, a server, a laptop computer, a tablet computer, a netbook computer, a personal computer (PC), or a desktop computer. In another embodiment, computing device 110 and computing device 120 respectively represent a computing system utilizing clustered computers and components to act as a single pool of seamless resources. In general, computing device 110 and computing device 120 respectively can be any computing device or a combination of devices with access to replication program 115 and volumes 117 and is capable of executing replication program 115. Computing device 110 and computing device 120 respectively may include internal and external hardware components, as depicted and described in further detail with respect to FIG. 3.

In this exemplary embodiment, replication program 115, system data 116 and volumes 117 are stored on computing device 110. However, in other embodiments, replication program 115, system data 116 and volumes 117 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110, computing device 120, replication program 115, system data 116 and volumes 117, in accordance with a desired embodiment of the present invention.

In exemplary embodiments, replication program 115 monitors the levels of access of sets of data included in volumes 117. Replication program 115 determines an importance rating for each set of data based on the changing I/O rates for each respective set of data. Replication program 115 dynamically changes the respective replication category of those sets of data based, at least in part, on their importance rating and in response to the importance rating changing beyond a threshold. Replication program 115 includes a number of thresholds that replication program 115 uses to determine whether or not an adjustment to a replication category of a set of data is needed and, if so, whether the level of replication should be increased or decreased. In some embodiments, replication program 115 monitors and utilizes a heat map to identify the importance of a given set of data. In such embodiments, the values of such a heat map reflect the number of I/O events and changing I/O rates for each respective set of data.

In exemplary embodiments, system data 116 includes records that indicate the I/O for respective sets of data included in volumes 117, e.g., a heat map, as well as the current (which can be measured), historical, and predicted latency between computing device 110 and 120. In general, a heat map is a visual representation of workload activity metrics for a set of data that is stored as heat values. A workload activity metric may be calculated for a set of data included in a logical volume, such as extents. The heat value may be a number on a scale and may be expressed as a temperature gradient from hot (high activity) to cold (low activity). In exemplary embodiments, volumes 117 is a database of sets of data that are accessed by users, via network 130, thereby generating the data I/O for respective sets of data that is stored as part of system data 116.

In this embodiment, computing device 110 serves as a primary storage site for volumes 117 and computing device 120 serves as a secondary storage site, i.e., a backup site, for volumes 117.

Figure 2:
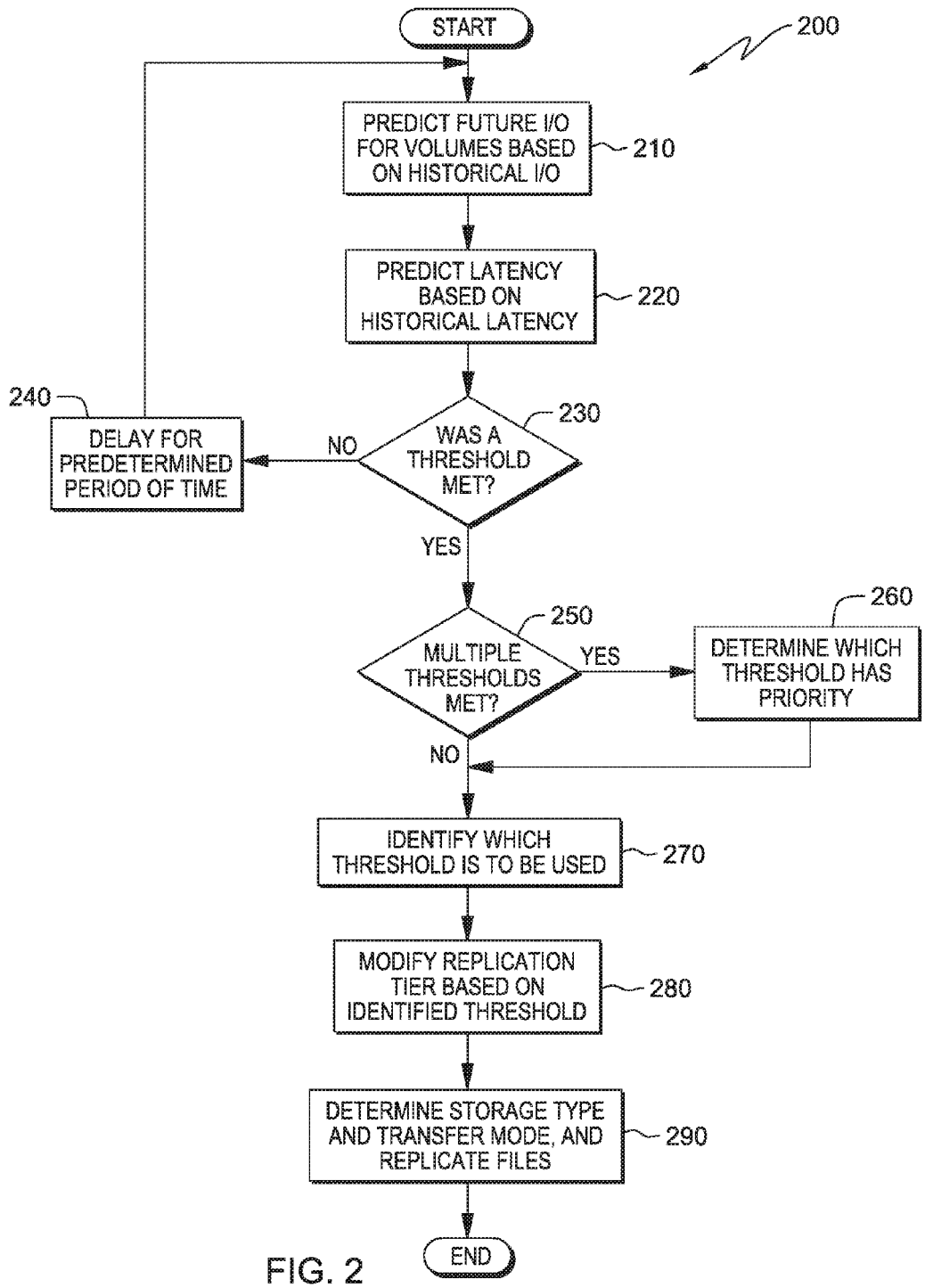
FIG. 2 illustrates operational processes of a replication program, executing on a computing device within the environment of FIG. 1, in accordance with an exemplary embodiment of the present invention.

FIG. 2 illustrates a flowchart, 200, illustrating operational processes of replication program 115, executing on computing device 110 within the environment of FIG. 1, in accordance with an exemplary embodiment of the present invention.

In process 210, replication program 115 predicts a future degree of I/O for the sets of data included in volumes 117 based on the historical I/O of those sets of data as indicated by the information included in system data 116. For example, a set of data, A3, was accessed and updated 2,800 to 3,000 times during the first and fourth quarters of the previous year. However, A3 was accessed less than one hundred times in each of the second and third quarters. Based on this data, replication program 115 predicts that there is a high probability that A3 will experience a high set of data of I/O during the first and fourth quarters of this year relative to the second and third quarters of this year.

In process 220, replication program 115 predicts a future degree of latency between computing device 110 and computing device 120 based on the historical latency as indicated by the information included in system data 116. For example, during business hours of a five day period, Monday through Friday, last week, there was a high degree of latency between computing device 110 and computing device 120 during the hours of 2 pm and 5 pm. However, there was a very low degree of latency between computing device 110 and computing device 120 during the hours of 7 am until 1 pm. Replication program 115 accesses system data 116 and determines that the current latency is likely to be high because the current day of the week is Wednesday and the time is 3 pm. Based on this data, replication program 115 predicts that the latency will remain high for the next two hours. In certain embodiments, replication program 115 directly tests for and determines the actual latency between computing device 110 and computing device 120.

In decision process 230, replication program 115 determines whether a threshold has been met, such that an adjustment to a replication category of a set of data is needed. For example, a threshold, T1, directed to I/O rates, dictates that an adjustment to a replication category of a set of data is required and that a synchronous transfer mode is utilized during replication if the I/O rate of that set of data exceeds five hundred operations during a particular period of time. If the I/O rate for a set of data, B7, has exceeded T1, then replication program 115 determines that an adjustment to a replication category of B7 is needed and that a synchronous transfer mode is to be utilized during replication. Continuing with the previous example, the I/O rate for set of data, C9, has exceeded T1. However, the latency between computing device 110 and computing device 120 has exceeded a threshold, T2, which dictates whether or not a synchronous transfer mode can be used during replication. As such, replication program 115 determines that an adjustment to a replication category of C9 is needed, since T1 was exceeded, and that, since T2 was also exceeded, a synchronous transfer mode cannot be used during replication. As such, a point-in-time or asynchronous transfer mode is used to backup C9, regardless of the number of backups required over a given time period and the requirements of T1, i.e., the dictated requirements of T2 take priority over the requirements of T1 if both thresholds have been met. If a threshold has been met such that an adjustment to a replication category of a set of data is needed (decision process 230, yes branch), then replication program 115 proceeds to decision process 250. If a threshold has not been met such that an adjustment to a replication category of a set of data is not needed (decision process 230, no branch), then replication program 115 proceeds to process 240.

In process 240, replication program 115 delays for a predetermined period of time. Replication program 115 delays further processing to prevent unnecessary adjustments to replication levels. Typically, a period of time is required for normalization of the replication process to occur. As such, a delay is used by replication program 115 to allow such normalization to complete. This delay also reduces wasteful use of computing resources by limiting how often replication program 115 checks whether or not a threshold has been met.

In decision process 250, replication program 115 determines if multiple thresholds have been met. If multiple thresholds have been met (decision process 250, yes branch), then replication program 115 proceeds to process 260. If multiple thresholds have not been met (decision process 250, no branch), then replication program 115 flags the threshold that was met and proceeds to process 270.

In process 260, replication program 115 determines which of the thresholds has the highest priority. For example, thresholds that are directed to I/O rates for sets of data s would have a higher priority than thresholds for latency. In another example, two thresholds for I/O have been met. The first threshold is a number of I/O events to a given set of data over the time period of one year. The second threshold is a number of I/O events to a given set of data over the time period of one week. Since the second threshold yields a more immediate indication of future I/O events for the set of data, replication program 115 determines that the second threshold has the higher priority. The threshold with the highest determined priority is then flagged.

In process 270, replication program 115 identifies which threshold is to be used, i.e., which threshold has been flagged. In process 280, replication program 115 modifies the replication category based on the identified threshold. In some cases, the frequency of replication for a given set of data is increased, in other cases that frequency is decreased. In other words, a set of data is assigned to a tier of replication, with an associated frequency of set of data replication, based on which threshold has been met that has the highest priority.

In process 290, replication program 115 determines an appropriate storage type, i.e., a type of storage media, and transfer mode, i.e., a mode of data transmission, which will best facilitate the frequency of replication for a given set of data. This is often based on the circumstances of the given set of data, e.g., which thresholds have been met and the predicted number of I/O events for that set of data. For example, a set of data that is assigned to a tier of replication with an associated high frequency of set of data replication may benefit most from the use of a high speed storage system and synchronous data transfer when replicating that set of data. However, in some circumstances, the type of storage used or the transfer mode is modified based on which thresholds have been met, such that the resulting tier of replication is, in general, not optimally paired with a storage tier and transfer mode, but is optimally paired based on thresholds being met, i.e., the current circumstances. For example, a set of data that is assigned to a tier of replication with an associated high frequency of set of data replication would benefit most from the use of a high speed storage system and synchronous data transfer when replicating that set of data. However, due to a high latency threshold being met, an asynchronous data transfer is used when replicating that set of data.

In this embodiment, replication program 115 ends after completion of process 290. In certain embodiments, replication program 115 proceeds to process 240 after completion of process 290. This allows for a predetermined period of time to pass such that a normalization of the replication of the set of data is completed. In some embodiments, the processes of replication program 115 are repeated periodically. As such, changes in the replication category of a given set of data would often necessitate a delay to prevent an undesirable number of changes in a replication category of a given set of data.

In some embodiments, in addition to determining an appropriate storage type and transfer mode that will best facilitate the frequency of replication for a given set of data, a type of representation is determined to be used to represent the set of data during the replication of the set of data, e.g., a summary of the values included in the data set.

Figure 3:
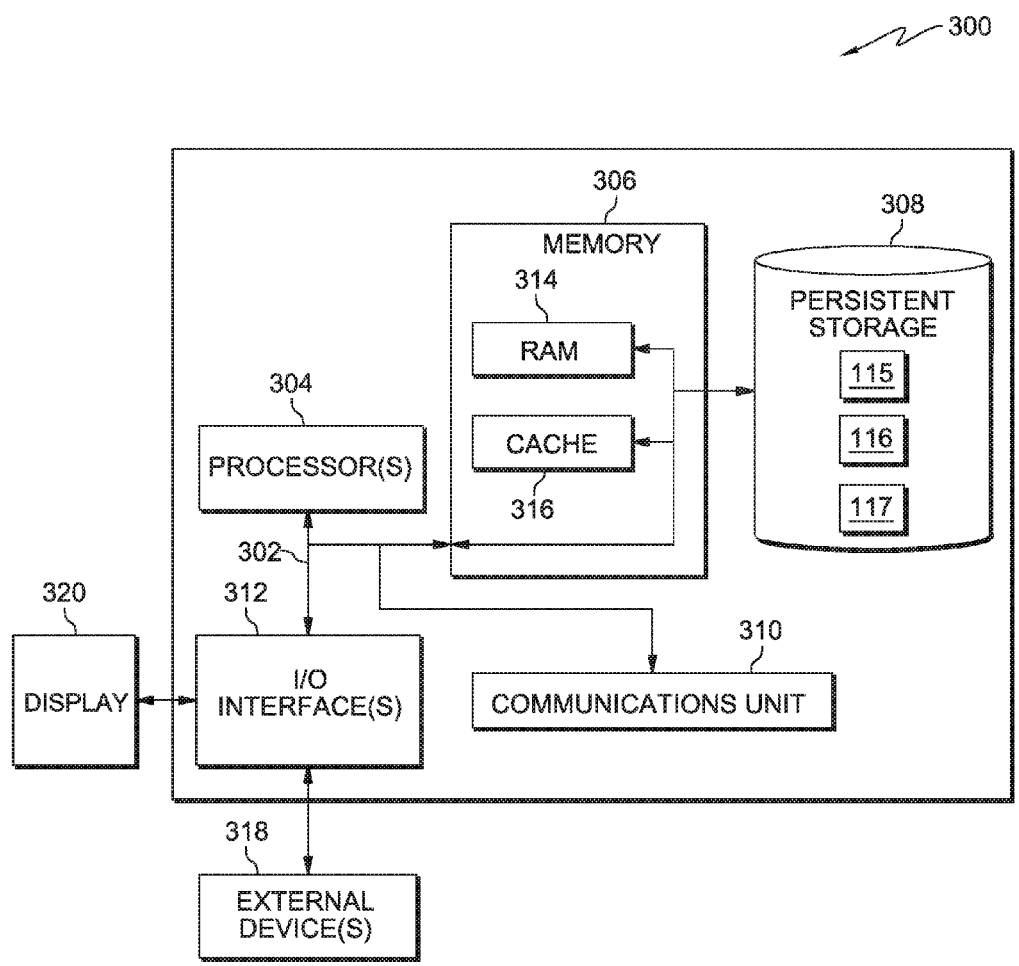
FIG. 3 depicts a block diagram of components of the computing device executing replication program, in accordance with an exemplary embodiment of the present invention.

FIG. 3 depicts a block diagram, 300, of respective components of computing device 110 and 120, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 and computing device 120 respectively include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Replication program 115 and volumes 117 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of network 130. In these examples, communications unit 310 includes one or more network interface cards. Communications unit 310 may provide communications through the use of either or both physical and wireless communications links. Replication program 115 and volumes 117 may be downloaded to persistent storage 308 through communications unit 310.

I/O interface(s) 312 allows for input and output of data with other devices that may be respectively connected to computing device 110 or computing device 120. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., replication program 115 and volumes 117, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising one or more computer readable storage media and program instructions stored on said one or more computer readable storage media, said program instructions comprising instructions to:

determine, by a processor, a first predicted quantity of updates that are likely to be made to a set of data based, at least in part, on a history of updates for the set of data, wherein the set of data is associated with a first category of replication that indicates a first frequency of data replication to be applied to the set of data;

determine, by the processor, whether the first predicted quantity meets a first threshold for a frequency of replication of the set of data, wherein the first threshold indicates an allowed number of updates for the set of data, and wherein a meeting of the first threshold indicates that an adjustment to the first frequency of replication of the set of data is to be initiated;

predict, by the processor, a degree of latency that will be experienced during replication of the set of data;

determine, by the processor, whether the first predicted quantity meets a plurality of thresholds for the frequency of replication of the set of data;

responsive to a determination that the first predicted quantity meets the plurality of thresholds, identify, by the processor, a threshold, included in the plurality of thresholds, that has the highest priority;

responsive to a determination that the first threshold has been met, associate, by the processor, the set of data with a second category of replication, wherein the second category of replication indicates a second frequency of data replication to be applied to the set of data, and wherein the association of the set of data with the second category of replication is based, at least in part, on i) the threshold that has the highest priority and ii) the predicted degree of latency meeting a third threshold, wherein the third threshold indicates a degree of latency that is allowed for given mode of data transmission;

associate, by the processor, the second category of replication with at least one of i) a type of storage media to be used during the replication of the set of data, ii) a mode of data transmission to be used during the replication of the set of data, and iii) a type of data that represents the set of data during the replication of the set of data, wherein the associating is based, at least in part, on the first predicted quantity meeting a second threshold for the frequency of replication of the set of data, wherein the second threshold being met indicates at least one of i) the type of storage media to be used during the replication of the set of data, ii) the mode of data transmission to be used during the replication of the set of data, and iii) the type of data that represents the set of data during the replication of the set of data; and responsive to a determination that the first threshold has been met, delay, by the processor, for a predetermined period of time, a determination as to whether a second predicted quantity of updates that are likely to be made to the set of data meets a third threshold for the frequency of replication of the set of data, wherein the delay allows for completion of a normalization process following replication of the set of data.

\* \* \* \* \*